March 1, 1966    P. J. HOGAN ETAL    3,237,288
METHOD AND MEANS FOR COLD-FORMING WHEEL HUBS
Filed March 18, 1964    3 Sheets-Sheet 1

INVENTORS
PATRICK J. HOGAN
LEONARD WALTON
BY  *John B Sowell*
ATTORNEY

March 1, 1966 P. J. HOGAN ETAL 3,237,288
METHOD AND MEANS FOR COLD-FORMING WHEEL HUBS
Filed March 18, 1964 3 Sheets-Sheet 2

INVENTORS
PATRICK J. HOGAN
LEONARD WALTON
BY
John B Sowell
ATTORNEY

March 1, 1966 P. J. HOGAN ETAL 3,237,288
METHOD AND MEANS FOR COLD-FORMING WHEEL HUBS
Filed March 18, 1964 3 Sheets-Sheet 3
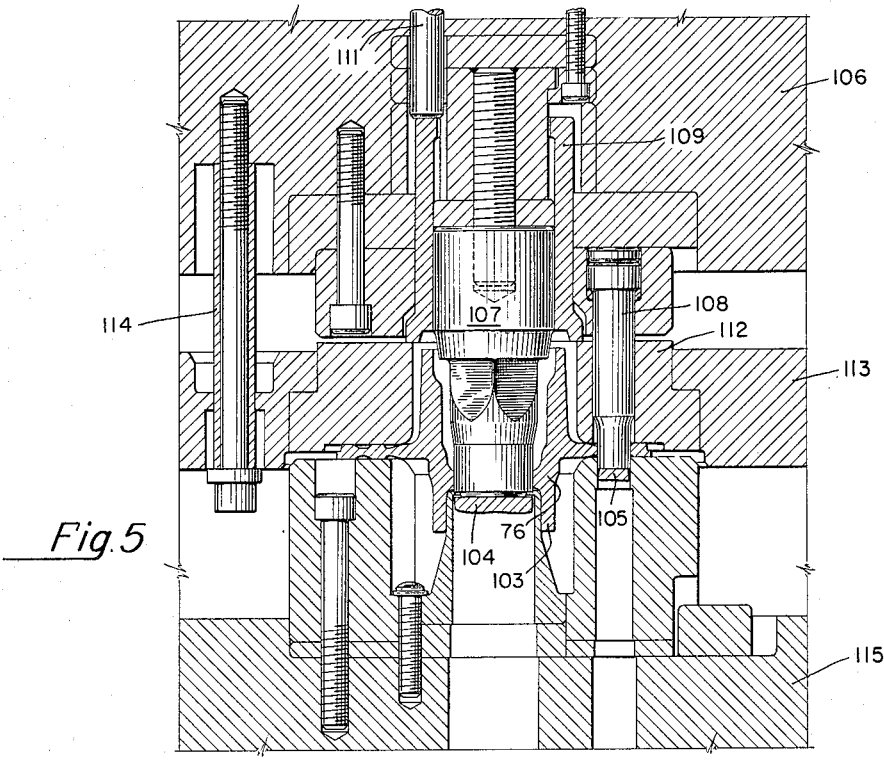
Fig.5
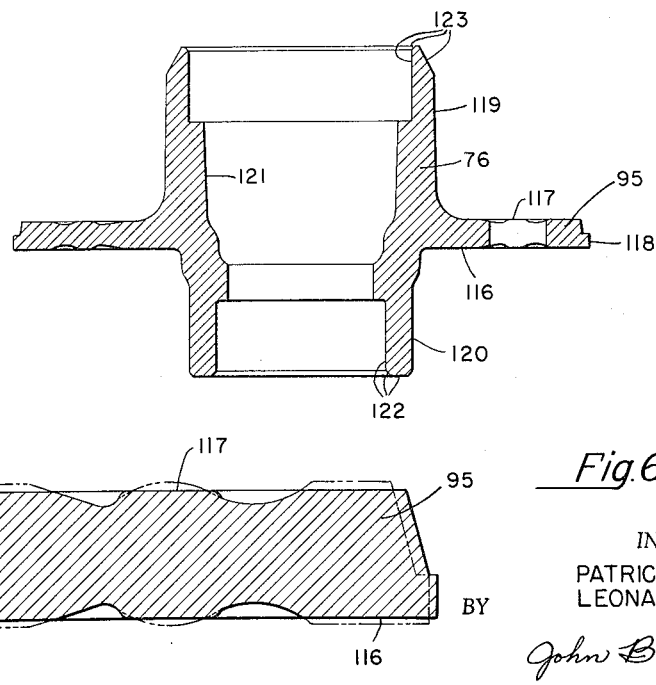
Fig.7
Fig.6
INVENTORS
PATRICK J. HOGAN
LEONARD WALTON
BY
John B Sowell
ATTORNEY

United States Patent Office 3,237,288
Patented Mar. 1, 1966

3,237,288
METHOD AND MEANS FOR COLD-FORMING WHEEL HUBS
Patrick J. Hogan, Mount Clemens, and Leonard Walton, Grosse Pointe, Mich., assignors to The Budd Company, Philadelphia, Pa., a corporation of Pennsylvania
Filed Mar. 18, 1964, Ser. No. 352,928
10 Claims. (Cl. 29—159.3)

This invention relates to a method and means of making wheel hubs and more particularly to a method of cold-forming to a machine finish a plurality of cylindrical surfaces simultaneously with a hub forming operation.

Heretofore, it has been the practice to cast or hot-forge flanged hubs to approximate shape to provide a wheel hub blank, and to machine turn all critical fitting surfaces to finished dimensions. While cold-forming is well known it has not been applied to large shapes such as wheel hubs made of steel because the stresses created tend to break up the dies and presses and/or to friction weld the dies to the cold formed parts. One of the present applicants has successfully cold-sized by coining the radial flange of a wheel hub avoiding the necessity of machine turning the flat surface of the radial flange as described in Patent No. 2,972,183. Even with this advance, it was necessary to provide excess metal in the cast or hot-forged blank to allow for inaccuracies and/or to permit machine turning finished cylindrical surfaces. When cylindrical surfaces of a wheel hub are machine turned it is necessary to locate the axial center of the hub by chucking on another cylindrical surface. Heretofore, there has been no cylindrical finished surface on which to locate the axial center. Usually, a machine turning operation is accomplished by turning one end of the hub blank, then inverting the part and again chucking on an unfinished surface to machine turn the other end of the blank. Even if the turning operation introduced no error, the hub could not be machined to zero tolerance relative to the other surface because of the errors in eccentricity and axial alignment that were present in the wheel hub blank.

Therefore, it is a primary object of the present invention to cold-form to a machine finish opposite axially aligned cylindrical tubular ends of a hub on a radial flange.

It is a further object of the present invention to form and to machine finish both ends of a cylindrical object and to size, coin and form an intermediate radial flange in a single die forming operation.

It is a further object of the present invention to cold-form and extrude simultaneously opposite cylindrical ends of a hub in a single forming operation.

It is a general object of the present invention to provide a new and improved method of forming, coining and extruding steel wheel hubs that eliminates the need for further machine finishing of the critical surfaces.

It is another object of the present invention to provide a method and means for cold-forming wheel hubs which requires less blank material and results in an improved and more accurate finished wheel hub.

According to the novel process a hub blank is prepared by preliminary forging operations to provide a preformed hub blank with a radial flange, an end having a cylindrical tubular preformed shape extending from one flange surface and another end having a solid disk preformed shape extending from the other surface; the tubular preformed shape is forced into a recessed cavity having the final form shape of one end of the hub to be formed; with the tubular preformed shape located in its recessed cavity the radial flange of the preformed hub is cold-formed and coined so as to simultaneously finish both surfaces of the radial flange and to size and finish form the outside diameter of the radial flange; with the final form radial flange contained in the coining dies and the tubular preformed shape located in the recessed cavity, a male extrusion die is engaged with the solid disk preformed shape to forwardly extrude and finally form the tubular preformed shape in the recessed cavity and to backwardly extrude and finally form a constant thickness cylindrical tube whereby both hub ends are simultaneously cold-formed to a machine finish in axial and radial alignment with the radial flange.

Other objects and advantages will be apparent from the following description of a preferred embodiment, the description of which is made in conjunction with the accompanying drawings, wherein:

FIG. 5 is a section in elevation through a set of piercing dies showing the core slug and the bolt holes removed from the cold-formed wheel hub;

FIG. 6 is an enlarged partial section taken through the radial flange of the cold-formed wheel hub of FIGS. 4 and 5 after the cold-forming and coining operation, the view superimposed thereon in broken lines is the shape of the preformed radial flange of FIG. 3;

FIG. 7 is a section in elevation of the wheel hub of FIG. 5 showing a cold-formed wheel hub that has been modified by machine turning.

In order to clearly describe the present method and to enable distinction between metal forming steps, specific descriptive terminology is applicable. The general descriptive terms employed herein are known and acceptable to those skilled in the art of metal working and have been set forth in "Plastic Working in Presses" by E. V. Crane, John Wiley Pub., 3rd ed., August 1957.

Generally, metalworking operations may be classified as hot-working (hot-forging) or cold-forming. All hot-working steps defined herein are performed at temperatures above that of recrystallization or annealing, and all cold-forming steps are performed at temperatures below recrystallization.

The operations to be performed herein also may be classified as shearing (or cutting) or cold-forming by bending, drawing and squeezing (or compressing). Shearing operations include piercing and punching where the ultimate strength of the metal is exceeded in shear.

Squeezing operations include sizing, swaging, coining and extruding. Bending operations include necking and expanding. All drawings, bending and squeezing cold-forming operations performed herein preferably cause plastic flow from one shape to another by stressing the metal beyond its elastic limit but not beyond its ultimate strength.

Figure 1:
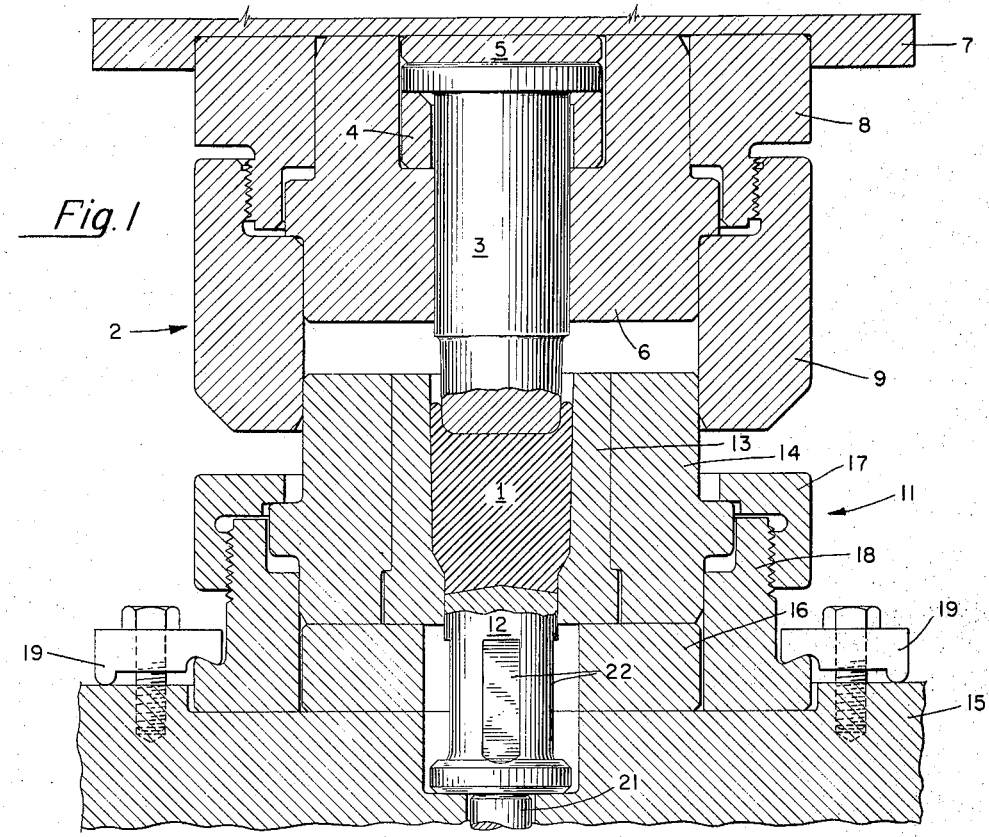
FIG. 1 is a section in elevation through a first set of forging dies showing the hub blank or workpiece after a first forging action has been completed.

Referring now to FIG. 1 showing the hub blank 1 after a first hot-forging operation. The upper composite die 2 is provided with a male forging die 3 positioned by a spacer ring 4 and a spacer plate 5 piloted in punch retainer 6. A punch retainer 6 is held in a counterbored recess of the platen or shoe 7 of a press (not shown) by an upper adapter ring 8 and a guiding retainer or pilot 9. The lower composite die 11 is provided with a floating punch 12 guided in a female die insert 13 which is held by a die insert retainer 14. Die insert 13 and insert retainer 14 are positioned relative to lower platen 15 by spacer 16. Die retainer 14 is connected to lower platen 15 by clamping ring 17 and base adapter 18 cooperating with clamp 19 secured to the platen 15 so as to permit horizontal movement relative thereto.

Guiding retainer or pilot 9 coacts with die insert retainer 14 so that male forging die 3 is always axially aligned with female die insert 13 during the working stroke. The upper composite die 2 is fixedly mounted relative to the upper platen or shoe 7 and the lower composite die 11 is mounted on lower platen 15 for horizontal movement relative thereto. Female die insert 13 has contact with the hub blank 1 a sufficient length of time during the hot-forging process to cause thermal expansion and heat transfer through the composite die to the lower platen 15 which causes dimensional changes. The self-aligning feature of the dies provides greater accuracy than normally employed guide pin which must have large clearance due to thermal expansion. Knock-out pin 21 is provided to force the hub blank 1 out of the lower composite die 11 and also serves as a floating or cushion pin to normally hold floating punch 12 in an upward extending position permitting any accumulated scale to pass out of the lower die cavity through the slotted passageways 22 provided in floating punch 12.

Figure 2:
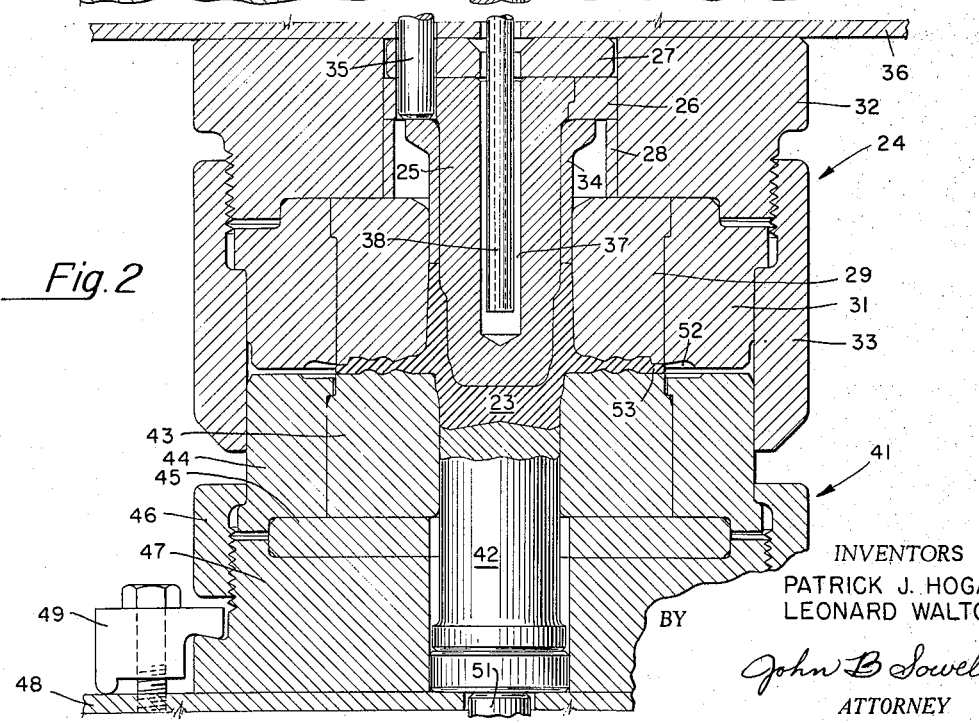
FIG. 2 is a section in elevation through a second set of forging dies showing the hub blank after a second forging action has been completed.

In the preferred embodiment, a second hot forging step is performed on blank 1 to provide a preformed hub blank 23 as shown in FIG. 2. Upper composite die 24 is provided with male forging die 25, spacer ring 26, spacer plate 27, retainer ring 28, upper female die insert 29, upper die insert retainer 31, upper adapter ring 32, guiding retainer or pilot 33, and stripper 34. Stripper 34 is operated by knockout pins 35 connected to a mechanical or fluid actuated device (not shown) through upper platen 36. Male forging die 25 is provided with a hollow recessed cavity 37 fitted with a water tube 38 for cooling the die.

Lower composite die 41 is provided with a floating punch 42, female die insert 43, die insert retainer 44, spacer 45, clamping ring 46 and base adapter 47 held to platen 48 by clamp 49. A knockout or cushion pin 51 coacts with floating punch 42 to remove preformed hub blank 23 from the lower composite die 41 after the working stroke. It will be noted that composite dies 24 and 41, as shown in FIG. 2 after the second forging operation, form a confining cavity with a radial opening 52 constituting a flash area for any excess metal from the blank 1. It is intended that a small amount of excess metal will be squeezed out of the dies and into the flash area to produce an outer flash 53 which is trimmed from the blank 23.

Figure 3:
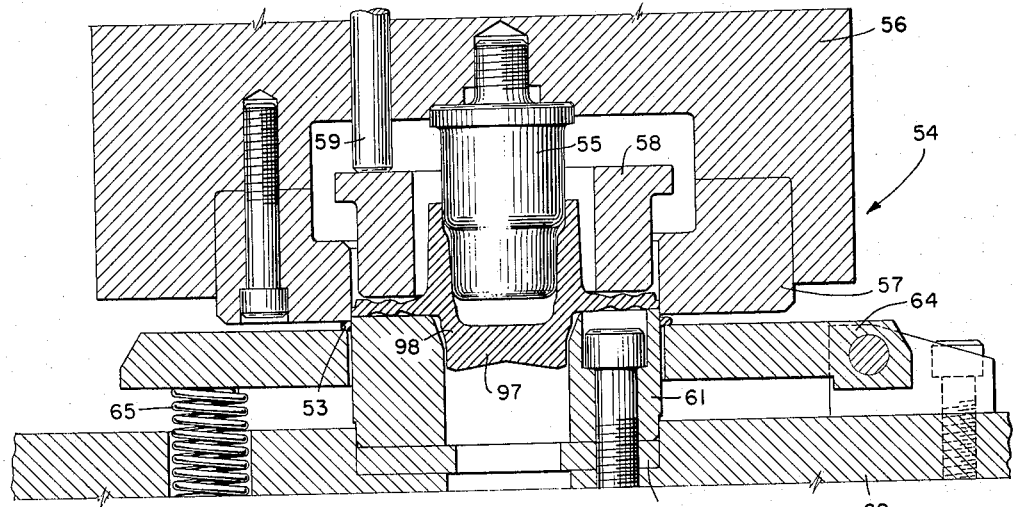
FIG. 3 is a section in elevation through a set of trimming dies showing the removal of the outer flash from the preformed hub blank.

In order to remove the outer flash 53 from the preformed blank 23 a set of blank trimming dies 54 is provided as shown in FIG. 3. Trimming dies 54 are provided wtih a male pilot and unloading punch 55 mounted in upper die retainer 56. Die retainer 56 also supports female blanking die 57 which serves as a guide and retainer for stripping die 58 operated by knockout pin 59. A male blanking die 61 is adjustably mounted on platen 62 by spacer 63. A pivotable ring stripper 64 is spring biased during trimming to automatically remove the outer flash 53 by employing a spring 65.

In the above described operations, a cylindrical billet was heated in an induction furnace (not shown) and initially upset while hot in the forging dies shown in FIG. 1; the hub blank was then removed from the lower composite die 11 and while still hot was inserted into lower composite die 41 where the second forging operation was performed. The outer flash 53 of the blank 23 was removed while the hub blank was still hot. The aforementioned blanking and forging operations may be performed in other ways or by other types of dies, such as those described in Patent No. 2,972,183 to provide the preformed blank.

Assuming that the steel hub blank 23 was heated above the recrystallization temperature and hot-forged it will have a scale that can be removed by shot blasting or an equivalent cleaning process.

Figure 4:
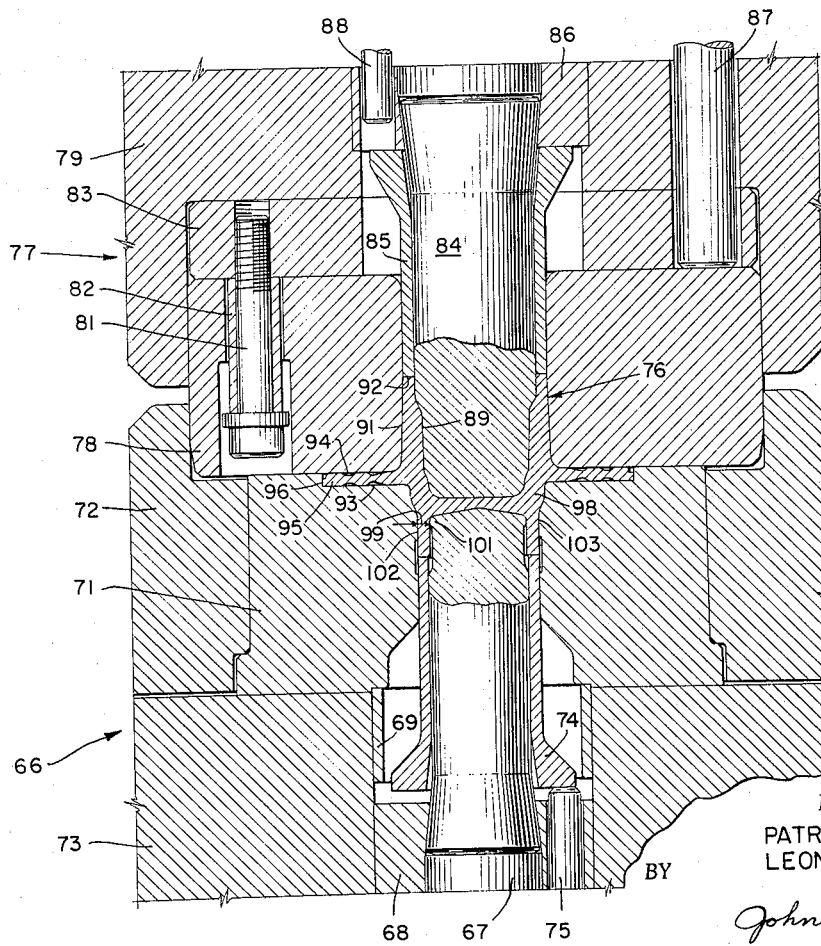
FIG. 4 is a section in elevation through a set of composite cold-forming dies for swaging, sizing, coining and extruding the hub blank showing the wheel hub after the combined cold-forming actions have been completed.

The next step involves cold-forming in the composite dies shown in FIG. 4, and is preferably performed with the steel hub blank 23 at room temperature. Stresses exerted on the end of the hub blank being squeezed and extruded in the dies are so severe that ordinary lubricants would be squeezed out from between the dies and the cold-forming step rendered inoperative. In the preferred embodiment shown, the hub blank 23 was thoroughly cleaned and phosphate coated and high pressure graphite lubricant was applied to the dies to prevent pressure welding of the blank to the dies. Applicants have discovered that Parker Rustproof Company's 182 X phosphate coat and H. A. Montgomery Company's M L–186 extruding lube to be operable in the present process. Cleaning and preparation operations as well as lubricants and phosphate coatings are discussed in standard textbooks and articles on the cold extrusion of metal and do not require further elaboration here.

Reference is made to FIG. 4 showing the composite dies for cold-forming steel hub blank 23 into a wheel hub having machine finished cylindrical surfaces on a double action press. The dies of FIG. 4 are shown in an inverted position to maintain similar orientation of the hub blank 23 throughout the process. Therefore when reference is made to the upper dies in FIG. 4 they will appear in the lower portion of FIG. 4. Upper composite die 66 is provided with a male extrusion punch 67 connected to a floating punch retainer 68. The downward movement of retainer 68 is limited by retainer ring 69 which is held in place by combination die 71, guiding retainer 72 and mounting plate 73, interconnected to each other and to the outer slide of the double action press (not shown) The inner slide of the double action press (not shown) is provided with a bumper (not shown) that hits extrusion punch 67 after combination die 71 has bottomed or completed its working stroke. Stripper 74, cooperating with knockout pins 75, is cam operated to strip finished hub 76 out of combination die 71 of upper composite die 66 when the press is open. Lower composite die 77 is provided with a floating combination die 78 slidably guided in guiding retainer 79 which is fixed to the lower platen (not shown); vertical movement of die 78 is guided by bolts 81 having guide spacer sleeves 82 thereon; spacer 83 affixed to retainer 79 by bolts (not shown) limits downward movement. A fixed male die 84 and movable stripper-confining die 85 are concentrically mounted in combination die 78. Male die 84 is retained and positioned by retainer 86 which in turn is held in place by guiding retainer 79 which is fixed to the lower platen. Dies 79, 83 and 84 remain stationary, however, die 78 is vertically movable by a lower cushion (not shown) through floating pins 87 that determine the extent of upward movement, floating pins 87 pass through guiding retainer 79, spacer 83 and the platen of the press (not shown). The purpose of the cushion and floating pins 87 is to provide a constant force on die 78 during limited vertical movement of pins 87. Knockout pins 88 cooperate with stripper-confining die 85 to remove the finished wheel hub 76 from the lower composite die 77.

In the operational environment of a double action press the lower end (longer cylindrical end) of the hub-blank 23 is forced into the lower cavity 89 formed by dies 78, 84 and 85 so as to center the hub blank in the floating combination die 78. The outside diameter of the lower cavity 89 is defined by cylindrical wall 91 of die 78; the end wall of the lower cavity 89 is defined by the annular wall 92 of the stripper-confining die 85; the inside diameter of the lower cavity 89 is defined by the upper end portion of male die 84. The volume of metal provided in the lower cylindrical end of hub blank 23 is less than the volume of the lower cavity 89 into which it is placed. The outside diameter of the hub blank 23 has a smaller diameter than the cylindrical wall 91 into which it is placed; and the length of the lower cylindrical end of the hub blank 23 is shorter than the depth of the lower cavity 89 but the upper end portion of male die 84 is larger than the inside diameter of hub blank 23. Thus, the operation of forcing hub blank 23 into lower cavity 89 expands the lower cylindrical end of hub blank 23. This may be termed as an expanding operation for the lower cylindrical end has both its inside and outside diameter made larger. The force necessary to expand the lower cylindrical end of hub blank 23 over male die 84 is provided by combination die 71 which is connected to the outer slide (not shown) of the double action press (not shown). Not only does combination die 71 force the lower cylindrical end of hub blank 23 into the lower cavity 89 but die 71 is provided with an upper annular surface 93 which co-operates with a lower annular surface 94 of die 78 to cold-form and coin the radial flange 95 of the finished hub 76. The radial flange of hub blank has been reduced in thickness by a coining operation and the outside diameter of the radial flange has been increased to conform to the axial cylinder portion 96 of die 71. This coining and forming operation of the radial flange and outer cylindrical diameter occurs when die 71 (acting on radial flange) causes die 78 to bottom or terminate its downward movement in engagement with spacer 83.

In the preferred embodiment of a double action press, extrusion punch 67 is moving downward simultaneously with combination die 71. However, combination die 71 bottoms, centering hub blank 23 in the lower composite die 77 before male extrusion punch 67 engages the solid disk preformed shape 97 (FIG. 4) of the hub blank 23. When male extrusion punch 67 initially engages solid disk preformed shape 97 it squeezes the disk 97 in compression causing it to form the neck 98 of the hub blank 76. This, in turn, causes a flow of metal from neck 98 into the lower cavity 89 completely filling and finishing the lower cylindrical end of finished hub 76. When the lower cavity 89 is completely filled, the metal is restrained from flowing radially outward into the radial flange 95 and has one avenue of escape, that is, through the annular extrusion orifice formed by the end portion 101 of extrusion die 67 and the cylindrical wall 102 of combination die 71. It will be noted that stripper 74 does not engage the extruded upper end 103 of the hub blank 76 and that cylindrical wall 102 as well as the end portion 101 of extrusion die 67 are undercut or recessed to avoid frictional engagement of the extruded upper end 103 of finished hub 76.

As explained above, the hub blank 23 was forced into the lower cavity 89 in an expanding operation and the terminal portion of the downward stroke of the outer slide both coined and formed radial flange 95. Prior to engagement of extrusion die 67 with the hub blank 23 neither the lower cylindrical end of hub 76 or the extruded upper end 103 had been finish formed. The squeezing operation of extrusion die 67 causes metal to flow into the lower cavity in which may be termed a forward extrusion and cold-forming operation. The neck of the hub blank is formed by what may be termed a swaging operation. However, the extruded upper end of finished hub 76 is formed by what may be termed a rearward (or backward) extrusion operation. This rearward or backward extrusion operation is not to be confused with impact extrusion or hot-forging operations where dimensional stability cannot be maintained. The metal in hub 76 has been cold-formed in compression below its recrystallization temperature causing an initial swaging and cold-forming operation of the lower cylindrical end of the hub in lower cavity 89. While the backward extrusion operation creates severe strains in the metal being cold-worked there is no annealing due to heat build-up nor is there any noticeable dimensional change of the thickness of the extruded upper end 103 of the hub 76 due to either a cold-working change of volume or heat build-up during cold working. The thickness of upper end 103 is substantially the same as the size of the annular extrusion orifice 99. The backward extrusion of the extruded upper end of the hub 76 was performed at rates substantially below impact extrusion rates with pressures substantially below those recommended for impact extrusion.

In the preferred embodiment shown and described, it is not necessary to machine finish the inside or outside diameter of either end of hub 76 for the cold-forming operation has produced a machine finish on the extruded upper end having an accuracy of ±.0003 inch in a hub having cylindrical diameters of 2 to 3 inches. The lower cylindrical end formed in lower cavity 89 is finished to ±.0015 inch. Both cylindrical ends and the outside diameter of the radial flange were found to have extremely accurate roundness and axial alignment with the flange.

Hub 76 may be blanked in the die set shown in FIG. 5 to remove the core slug 104 and bolt hole slugs 105. It is desirable to remove these slugs by dies for the operation is more accurate as well as cheaper. Any one of the machine finished cylindrical diameters could serve as a pilot surface for centering the hub even though the extruded end 103 has been so employed in FIG. 5. Upper die retainer 106 is connected to the upper platen (not shown) and provides the support for blanking punches 107 and 108. Stripper 109 is actuated by cushion pins 111 and serves to slidably operate hold down ring 112 which positions the hub 76 in the dies. Hold down ring 112 is attached to guide ring 113 slidably mounted on sleeves 114. To further maintain the extreme accuracy of the blanking dies for slugs 104 and 105, a set of guide pins (not shown) interconnects dies 106, 113 and lower die retainer 115.

The enlarged radial flange 95 shown in FIG. 6 illustrates how the blank 23 of FIG. 2 as shown in dotted lines has been finished by coining and forming, as indicated in solid lines, to provide finished reference surface 116, finished annular surface 117 and finished cylindrical diameter 118. The distance from reference surface 116 of flange 95 to the end of the hub formed by annular wall 92 of die 85 in cavity 89 is as precise as the dies employed to cold-form the hub. However, the opposite end of hub (the backward extruded end) was not formed in a closed cavity and its distance relative to the reference surface 116 depends upon the accuracy of the hot-forged blank. It has been found that the extruded end of the hub is shaped accurately and with a substantially flat end, and it has not been necessary to machine finish this end. Usually, there is no requirement that the extruded hub end be machine turned, but if the necessity arises there are five accurate machine finished diameters in radial and axial alignment that can be used to chuck the finished hub 76.

FIG. 7 shows the finished hub 76 after being modified by machine turning to provide a configuration conforming to a hub made by prior art methods. It was found that the modified hub method saved one-half pound of steel per hub over the prior art method of machine turning. The modified hub has cold-formed and finished surfaces 116 to 121 as already explained; in addition, surfaces 122 at the backward-extruded end, and surfaces 123 at the forwardly-extruded-and-formed end have been machine turned to provide a bearing seat. As already pointed out above, the cold-forming operation has produced bearing seats of sufficient accuracy to accept a standard bearing. If the hub is completely cold-formed with no machine turning operation and the same strength and size is maintained as the modified hub as FIG. 7 a saving of greater than one-half pound of metal is achieved and the cost of producing the hub has been substantially reduced.

It should appear obvious to those skilled in this art that hubs with surfaces 116 to 123 can be made by the method described to have greater accuracy than those produced by prior art machine turning methods. Even greater accuracy may be achieved by cold expanding or necking the end of the hub having the greatest variation; in this instance, the larger diameter end.

While one embodiment of the invention has been described and illustrated it is to be understood that there may be other embodiments within the scope of the invention, for example, the cold-coining of the flange may be a separate step or the novel method performed in a sequence or different sequence on a single action press or presses.

What is claimed is:

1. A method of die forming wheel hubs comprising the steps of: preforming a hub blank having upper and lower ends and a radial flange portion, cold-coining and cold-forming said radial flange to finished dimensions, piloting on said finished radial flange to align the lower end of said hub in a cavity and the upper end in axial alignment with an extruding punch, and squeezing said hub ends with said extruding punch to forwardly extrude said lower end of said hub and simultaneously backwardly extrude said upper end of said hub, whereby both ends of said hub are cold-formed to finished size simultaneously while axially and radially aligned with said finished radial flange.

2. A method of die forming wheel hubs comprising the steps of: preforming steel stock to provide a hub blank having a lower cylindrical hub portion, a radial flange portion, and an upper hub portion; coining said radial flange portion to finished size; sizing said lower cylindrical hub portion to a finished inside diameter; and backwardly extruding said upper hub portion by squeezing said upper hub portion while confining said radial flange and said lower hub portion to produce a cold-formed hub having machine finished tubular ends in axial and radial alignment with each other and with said radial flange.

3. A method of die forming wheel hubs comprising the steps of: performing steel stock to provide an unfinished cylindrical hub portion and a finished radial flange portion, confining one end of the cylindrical hub portion, confining the outside diameter of the other end of the hub portion, confining the radial flange portion, and squeezing said other end of the hub portion so as to exceed the yield point of the steel and cold-form and forwardly extrude said one end of the cylindrical hub portion, and to cold-form and backwardly extrude said other end of the hub portion, whereby both ends of said hub are cold-formed in axial and radial alignment with each other and with said radial flange to provide a machine finish hub.

4. A method of die forming wheel hubs as set forth in claim 3 which further includes piloting on one of said cold formed hub ends and blanking a core slug and a plurality of bolt hole slugs from said machine finish hub.

5. A method of making steel wheel hubs from barstock comprising the steps of: forging said barstock to simultaneously form a lower cylindrical tubular hub portion and an intermediate radial flange portion to provide a preformed hub blank, trimming the flash from the outside diameter of said radial flange hub portion of said hub blank, cleaning and phosphate coating said hub blank in preparation for cold-forming, radially centering and simultaneously sizing said lower cylindrical tubular hub portion by forcing it into a lower confining die cavity having a volume greater than said tubular hub portion, coining annular faces on said radial flange hub portion and simultaneously forming a radial face at the outside diameter of said radial flange while maintaining said lower cylindrical tubular hub portion radially centered, containing said radial flange at said annular faces while maintaining said lower cylindrical tubular hub portion in said lower confining die cavity and, simultaneously forwardly extruding and forming said lower cylindrical tubular hub portion to the exact size of said die cavity and backwardly extruding an upper cylindrical tubular hub portion on said hub blank to provide a steel wheel hub having cold-formed and finished cylindrical tubular hub portions axially and radially aligned with cold-formed and finished radial flange faces.

6. A method of making steel wheel hubs from barstock comprising the steps of: forging said barstock to simultaneously form a lower cylindrical tubular hub portion and an intermediate radial flange portion to provide a preformed hub blank, trimming the flash from the outside diameter of said radial flange hub portion of said hub blank, cleaning and phosphate coating said hub blank in preparation for cold-forming radially centering and simultaneously sizing said lower cylindrical tubular hub portion by forcing it into a lower confining die cavity having a volume greater than said tubular hub portion, coining annular faces on said radial flange hub portion while maintaining said lower cylindrical tubular hub portion radially centered, containing said radial flange at said annular faces while maintaining said lower cylindrical tubular hub portion in said lower confining die cavity and, simultaneously forwardly extruding and forming said lower cylindrical tubular hub portion to the exact size of said die cavity and backwardly extruding an upper cylindrical tubular hub portion on said hub blank to provide a steel wheel hub having cold-formed and finished cylindrical tubular hub portions axially and radially aligned with cold-formed and finished radial flange faces.

7. A method of making steel wheel hubs according to claim 6 which further includes piercing a cylindrical core from the center of said steel wheel hub and simultaneously piercing a plurality of bolt holes in said radial flange concentric with said axial center by piloting on a surface of said backwardly extruded upper tubular hub portion.

8. A die set for use in a double action press of the type having an upper inner and an upper outside slide and a lower cushion comprising, a lower male punch fixed to said press, a lower combination die surrounding said lower male punch and forming a lower cavity therebetween, said lower combination die being floatingly mounted on said lower cushion for vertical movement relative to said lower male punch, a lower guiding retainer fixed to said press for guiding said vertical movement of said lower combination die and limiting its downward movement, an upper combination die including a pilot connected to said upper outer slide adapted to engage and pilot on said lower combination die, and a floating extrusion punch concentrically located in said upper combination die and engageable by said inner slide to extrude a blank held between said combination dies after said lower combination die has been moved by said upper combination die to its limit of downward movement forcing said blank into said cavity whereby said blank is cold-formed and extruded simultaneously by said extrusion punch.

9. A die set for use in a double action press as set forth in claim 8 which further includes a stripper concentrically mounted on said extrusion die for removing the formed blank from said extrusion die.

10. A die set for use in a double action press as set forth in claim 7 which further includes a retainer ring concentrically mounted in said upper combination die for limiting the downward movement of said extrusion punch relative to said upper combination die.

References Cited by the Examiner
UNITED STATES PATENTS

| | | | |
|---|---|---|---|
| 2,599,706 | 6/1952 | Friedman | 72—327 |
| 2,972,183 | 2/1961 | Greenshields et al. | 29—159.3 |
| 3,069,756 | 12/1962 | Colestock | 29—159.2 |

JOHN F. CAMPBELL, *Primary Examiner.*

T. H. EAGER, *Assistant Examiner.*